(12) United States Patent
Roberts et al.

(10) Patent No.: US 7,907,311 B2
(45) Date of Patent: Mar. 15, 2011

(54) SCANNER WITH AN ADJUSTABLE LIGHT SOURCE FOR SCANNING OPAQUE AND TRANSPARENT MEDIA

(75) Inventors: David Troy Roberts, Loveland, CO (US); Michael A. Tregoning, Greeley, CO (US); Meing Fai Nigel Cheung, Fort Collins, CO (US); Edward G. Trick, Louisville, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1066 days.

(21) Appl. No.: 11/706,625

(22) Filed: Feb. 13, 2007

(65) Prior Publication Data

US 2008/0192307 A1   Aug. 14, 2008

(51) Int. Cl.
 *H04N 1/04* (2006.01)
(52) U.S. Cl. ........ 358/487; 358/474; 358/475; 358/497; 358/498
(58) Field of Classification Search .................. None
 See application file for complete search history.

(56) References Cited

U.S. PATENT DOCUMENTS

| 5,446,276 | A | * | 8/1995 | Iyoda et al. | 250/208.1 |
| 5,621,563 | A | * | 4/1997 | Brook et al. | 359/210.1 |
| 5,673,125 | A | * | 9/1997 | Merecki et al. | 358/487 |
| 5,710,643 | A | * | 1/1998 | Depiano | 358/487 |
| 5,814,809 | A | * | 9/1998 | Han | 250/208.1 |
| 5,818,611 | A | * | 10/1998 | Shih | 358/474 |
| 5,822,087 | A | * | 10/1998 | Tsai | 358/475 |
| 5,966,221 | A | * | 10/1999 | Tellam et al. | 358/475 |
| 6,169,611 | B1 | * | 1/2001 | Brook et al. | 358/487 |
| 6,175,110 | B1 | * | 1/2001 | Tsai | 250/234 |
| 6,233,063 | B1 | * | 5/2001 | Bernasconi et al. | 358/474 |
| 6,243,185 | B1 | * | 6/2001 | Lin et al. | 359/196.1 |
| 6,388,775 | B1 | * | 5/2002 | Chiu | 358/474 |
| 7,072,082 | B2 | * | 7/2006 | Yokota | 358/497 |
| 7,170,649 | B2 | * | 1/2007 | Chang | 358/474 |
| 7,352,498 | B2 | * | 4/2008 | Harris | 358/497 |
| 7,505,184 | B2 | * | 3/2009 | Hayashide | 358/497 |
| 2002/0105684 | A1 | * | 8/2002 | Huang | 358/474 |
| 2004/0207886 | A1 | * | 10/2004 | Spears | 358/474 |
| 2006/0250664 | A1 | * | 11/2006 | Chien | 358/474 |

* cited by examiner

*Primary Examiner* — Mark K Zimmerman
*Assistant Examiner* — Dung D Tran

(57) ABSTRACT

A scanner has a movable carriage, a platen that is substantially transparent to visible light overlying the carriage, and a light source physically connected to the carriage for moving therewith. The light source is selectively movable between a first position for scanning substantially opaque media positioned on the platen, and overlying the light source, and a second position for scanning media substantially transparent to visible light underlying the light source.

6 Claims, 14 Drawing Sheets

US 7,907,311 B2

SCANNER WITH AN ADJUSTABLE LIGHT SOURCE FOR SCANNING OPAQUE AND TRANSPARENT MEDIA

BACKGROUND

Image-capturing devices, such as scanners, may be configured to scan opaque media and at least partially transparent media, such as transparencies, photo-negatives, slides, etc. When scanning opaque media, light is typically reflected off an image on the surface of the opaque media and onto a sensor that converts the received light into a signal containing data corresponding to the image on the surface of the opaque media. Transparent media are scanned by passing light through the transparent media and onto a sensor that converts the light into an image signal containing data corresponding to an image on the surface of the transparent media.

Some conventional scanners include a separate light source to backlight the image on the transparent media. The backlight source may be included in a separate transparent media adapter or may be integrated within the scanner equipment, such as in the cover that overlays the scanner platen. However, the backlight source and its implementation hardware add complexity and cost to the scanner. Still other techniques for scanning both transparent and opaque documents include, for example, eliminating the backlight source and collecting the light from the light source used for scanning the opaque media and reflecting the light through the transparent media. However, such techniques require implementation hardware that adds complexity and cost to the scanner.

DETAILED DESCRIPTION

In the following detailed description of the present embodiments, reference is made to the accompanying drawings that form a part hereof, and in which are shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
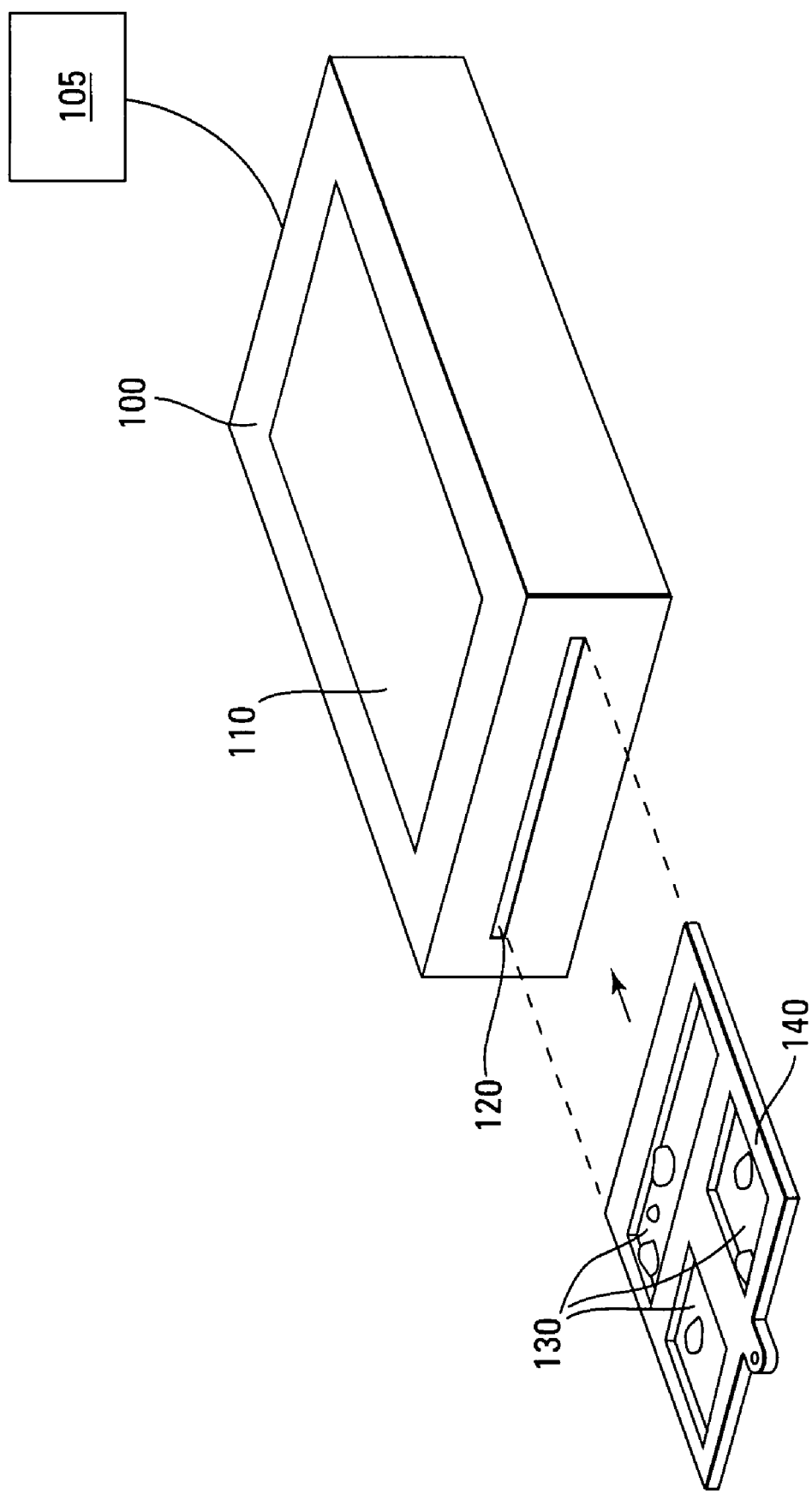
FIG. 1 is an isometric view of an embodiment of a scanner, according to an embodiment of the disclosure.

FIG. 1 is an isometric view of a scanner 100, such as a flat-bed scanner, according to an embodiment. Scanner 100 has a platen 110, e.g., of clear glass or plastic, that is substantially transparent to visible light and that receives substantially opaque media, such as paper, for scanning in an opaque scanning mode. Scanner 100 includes an opening 120, such as a slot, in one of its ends for receiving at least partially transparent media, or media substantially transparent to visible light (hereinafter referred to as transparent media), such as transparencies, photo-negatives, slides, etc., for scanning in a transparent scanning mode. For another embodiment, the transparent media, such as transparent media 130, may be disposed in a template 140 that may be received in opening 120 for scanning in the transparent scanning mode. For another embodiment, scanner 100 may be electronically coupled to an external computer 105.

Figure 2A:
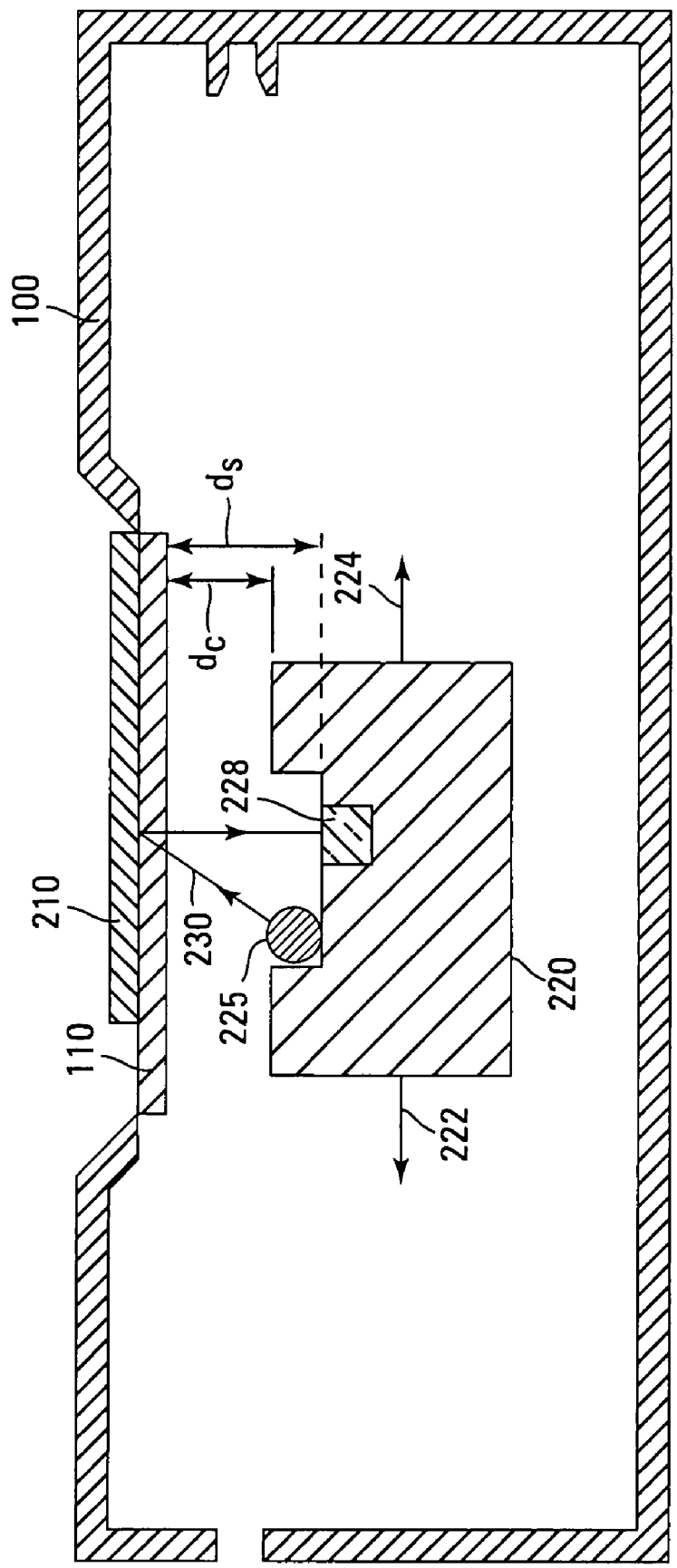
FIG. 2A is a cross-sectional side view of an embodiment of a scanner scanning substantially opaque media, according to another embodiment of the disclosure.

FIG. 2A is a cross-sectional side view of scanner 100 operating in the opaque scanning mode, according to another embodiment. A substantially opaque medium 210 is disposed on platen 110 and is being scanned. A movable carriage 220 moves in the direction of arrow 222, relative to opaque medium 210, while scanning opaque medium 210. When scanning is completed, carriage 220 is moved in the direction of arrow 224 to an initial position from where another scan may be initiated. It will be appreciated by those of skill in the art that carriage 220 may ride on a rail (not shown) or within slots that provide a track (not shown).

A radiation source, such as a light source 225, e.g., a cold cathode lamp, a cold cathode fluorescent lamp, or the like, is connected to carriage 220 for movement therewith. A sensor 228, such as a photosensitive device, e.g., an array of charge-coupled devices (or CCDs), is disposed on carriage 220 for converting light received thereat into one or more electronic signals. Note that in the opaque scanning mode, opaque medium 210 overlies light source 225 so that platen 110 is interposed between opaque medium 210 and light source 225.

In operation, light 230, e.g., visible light, from light source 225 is directed through platen 110 and onto a downward facing surface of opaque medium 210, as shown in FIG. 2A. The downward facing surface of opaque medium 210 reflects light 230 onto sensor 228. Sensor 228 converts the reflected light into one or more electronic signals that correspond to one or more images on opaque medium 210. For one embodiment, the electronic signals are sent to computer 105 (FIG. 1) for processing.

Figure 2B:
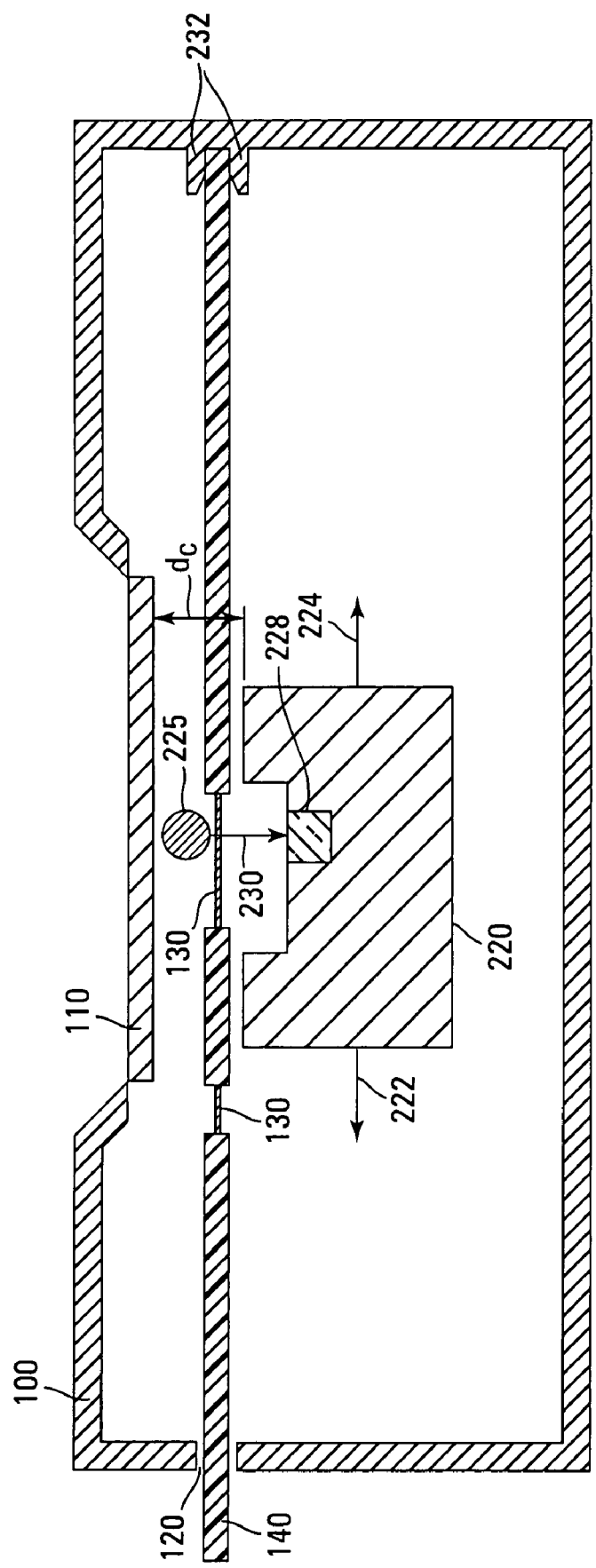
FIG. 2B is a cross-sectional side view of an embodiment of a scanner scanning media substantially transparent to light, according to another embodiment of the disclosure.

FIG. 2B is a cross-sectional side view of scanner 100 operating in the transparent scanning mode, according to another embodiment. In the transparent scanning mode, light source 225 is moved away from carriage 220 and toward platen 110. For one embodiment, light source 225 may be aligned with sensor 228, e.g., so that light source 225 is directly above sensor 228, as shown in FIG. 2B. A transparent medium or template 140 containing transparent media 130 is inserted into scanner 100 through opening 120 so that the transparent medium or template 140 containing transparent media 130 is located between light source 225 and carriage 220 and thus sensor 228. Moreover, note that in the transparent scanning mode, the transparent medium or template 140 containing transparent media 130 underlies light source 225 so that light source 225 is interposed between the transparent medium or template 140 containing transparent media 130 and platen 110.

For one embodiment, template 140 may be received in a slot formed between a pair of protrusions 232 that protrude from an inner surface of scanner 100 that is opposite opening 120, as shown in FIG. 2B. For another embodiment, protrusions 232 may be resilient so as to forcibly engage template 140. For anther embodiment, protrusions 232 may be chamfered, as shown on FIG. 2B, so as to facilitate their being deflected apart by template 140. For some embodiments, template 140 may be received in a slot formed in the inner surface of scanner 100 that is opposite opening 120.

In operation, light 230 from light source 225 is directed directly through the transparent medium and onto sensor 228, as shown in FIG. 2B. Sensor 228 converts the light into one or more electronic signals that correspond to one or more images on the transparent medium. For one embodiment, the electronic signals are sent to computer 105 (FIG. 1) for processing.

Figure 3:
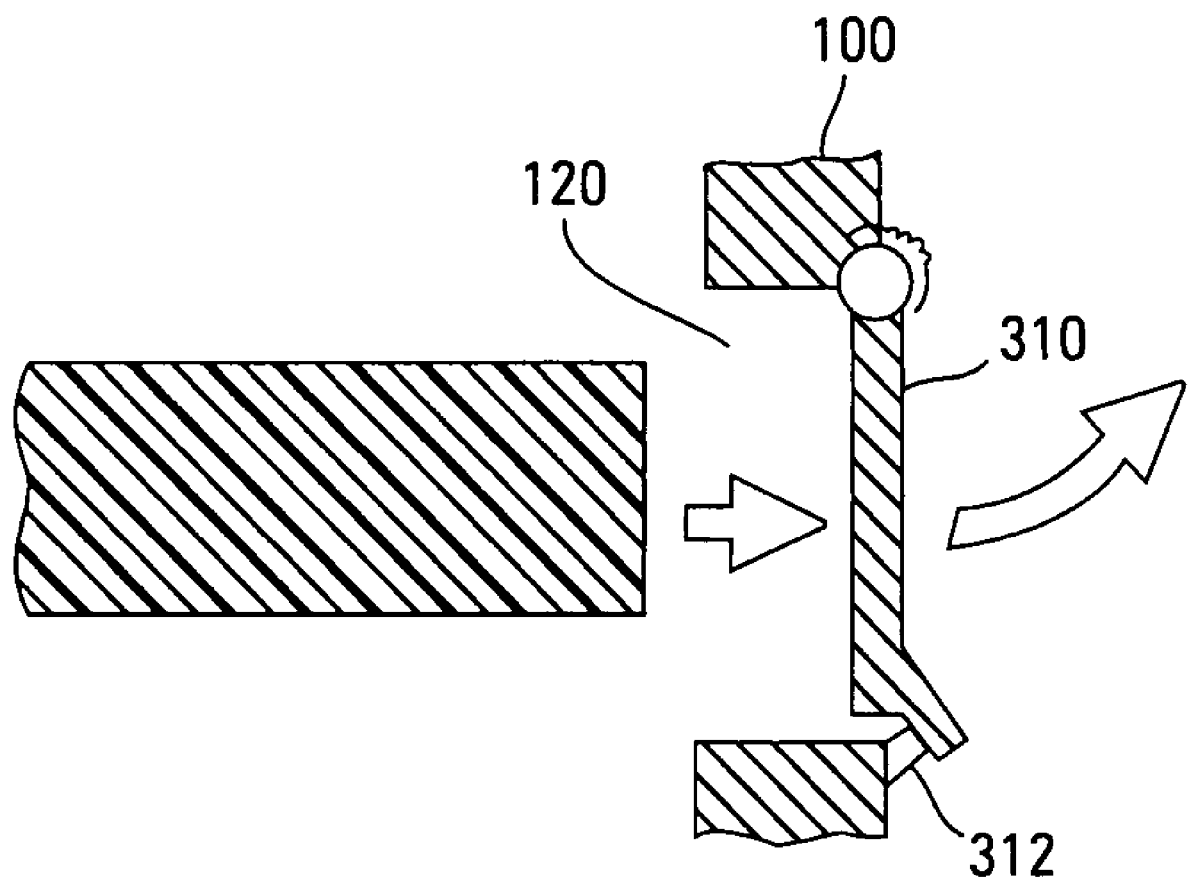
FIG. 3 is a cross-sectional side view of an embodiment of a door for closing an opening in a scanner for receiving media substantially transparent to light, according to another embodiment of the disclosure.

FIG. 3 is a cross-sectional side view of a door 310 that may be used to close the opening 120 in the end of scanner 100. When template 140 or a transparent medium is inserted into scanner 100, template 140 or the transparent medium engages door 310 and pushes door 310 open. For one embodiment, door 310 may be biased to close opening 120, e.g., by a torsional spring. For another embodiment, a seal 312 may be disposed on an inner portion of an edge of opening 120 or on a portion of door 310 for preventing dust from entering scanner 100.

Figure 4A:
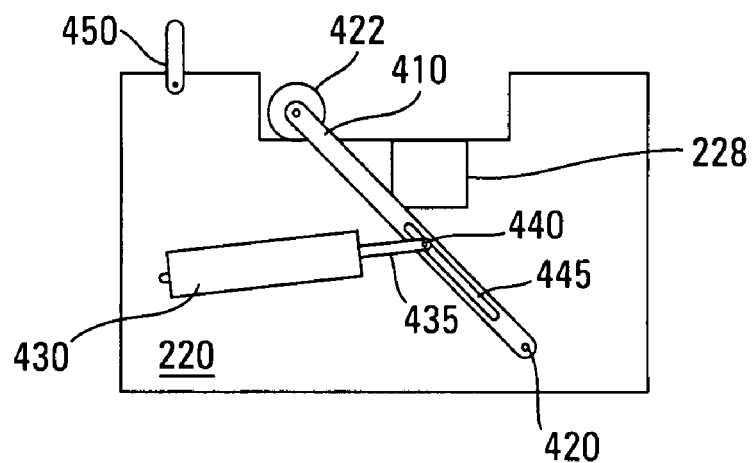
FIGS. 4A and 4B are side views of an embodiment of a carriage of a scanner in two different operating modes, according to another embodiment of the disclosure.
Figure 4B:
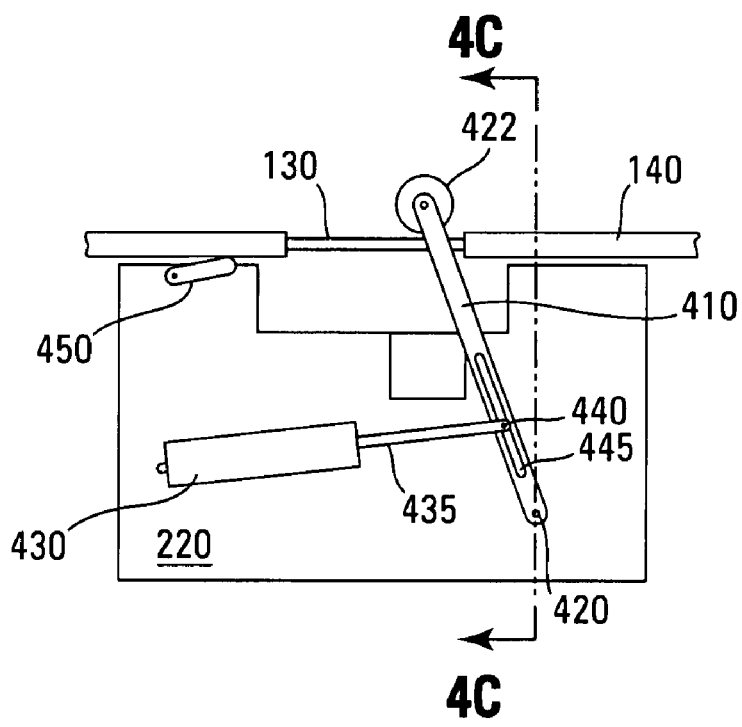
Figure 4C:
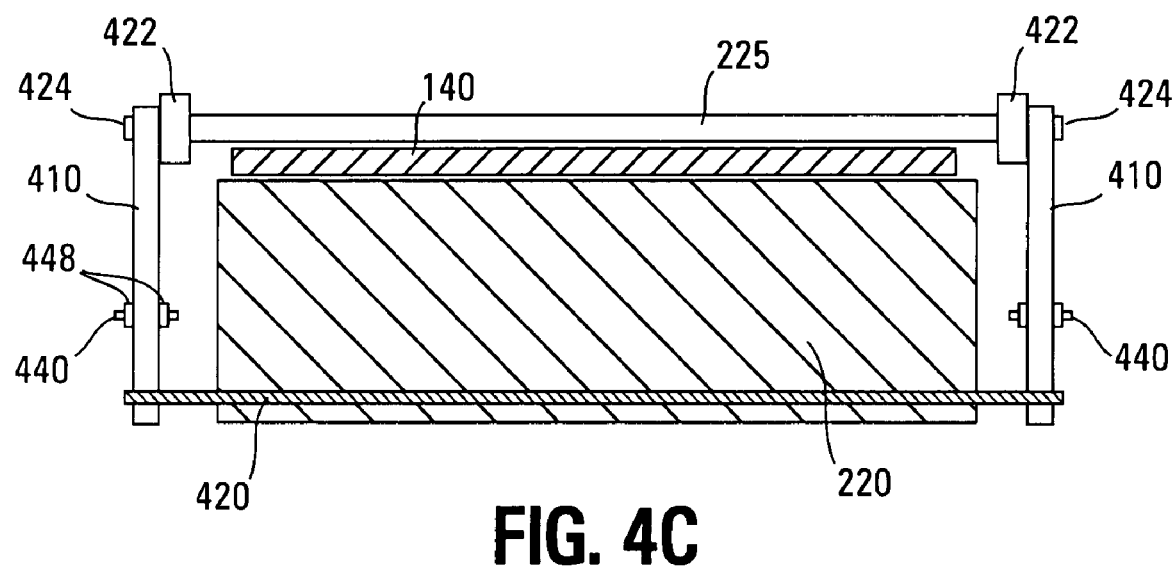
FIG. 4C is a view taken along line 4C-4C of FIG. 4B, according to another embodiment of the disclosure.

FIGS. 4A and 4B are side views of carriage 220 as may be viewed with one of the sidewalls of scanner 100 removed, according to another embodiment. FIG. 4C is a view taken along line 4C-4C of FIG. 4B. For one embodiment, arms 410 may be pivotally connected to carriage 220 by a shaft 420 that passes through and protrudes from carriage 220 (FIG. 4C). Alternatively, arms 410 may be pivotally connected to pins protruding from carriage 220. For one embodiment, shaft 420 or the pins are fixedly connected to carriage 220, and arms 410 are rotatably connected to their respective pins or shaft 420. For other embodiments, shaft 420 or the pins may be rotatably connected to carriage 220, and arms 410 may be fixedly attached to their respective pins or shaft 420.

Note that FIG. 4A corresponds to the opaque scanning mode and FIGS. 4B and 4C correspond to the transparent scanning mode. As seen in FIG. 4C, arms 410 straddle template 140, and light source 225 is connected between arms 410 so that light source 225 spans the entire width of template 140 in a direction perpendicular the scanning direction and a direction of motion of arms 410. For one embodiment, light source 225 may be mechanically connected to connectors 422, which in turn are mechanically connected to arms 410, e.g., by pins 424, as shown in FIG. 4C. For another embodiment, connectors 422 may also be electrically connected to light source 225 for supplying power to light source 225 from a power source (not shown) of scanner 100 electrically coupled to connectors 422.

For one embodiment, one or both of arms 410 may be respectively connected to a ram 435 of an actuator 430, such as a solenoid, that may be attached to carriage 220, as shown in FIGS. 4A and 4B for one of arms 410. More specifically, a ram 435 may be slidably connected to a respective arm 410 by a pin 440 that passes through a slot 445 in the respective arm 410, as shown in FIGS. 4A and 4B. For one embodiment, a ram 435 may be formed with a pair of tines 448 on an end thereof that straddle an arm 410, as shown in FIG. 4C, and pin 440 passes through tines 448 and slot 445.

For one embodiment, actuator 430 extends or retracts ram 435 in response to electrical signals from a controller (not shown) of scanner 100. As ram 435 extends or retracts, pin 440 slides in slot 445, and arm 410 pivots light source 225 between the position of FIG. 4A, corresponding to the opaque scanning mode, and the position of FIG. 4B, corresponding to the transparent scanning mode. For another embodiment, the controller controls actuator 430 in response to user inputs to computer 105 (FIG. 1). For example, the controller may send an electrical signal that causes actuator 430 to move light source 225 to the position of FIG. 4B in response to the user selecting the transparency mode of operation, e.g., from a menu displayed on the monitor of computer 105 or from a graphical user interface (not shown) of scanner 100.

For another embodiment, template 140 or a transparency engages a lever 450 as template 140 or the transparency is inserted into scanner 100, as shown in FIG. 4B. Lever 450 in turn activates a switch that causes an electrical signal activate actuator 430, causing actuator 430 to move light source 225 to the position of FIG. 4B. Removing template 140 or the transparency causes lever 450 to return to the position of FIG. 4A, in which position lever 450 is biased for one embodiment. This causes the switch to deactivate actuator 430, causing actuator 430 to move light source 225 to the position of FIG. 4A.

For embodiments where shaft 420 is rotatably connected to carriage 220 and arms 410 are fixedly attached to shaft 420, a motor, such as a stepper motor, may be connected to shaft 420. Upon activation, the motor rotates shaft 420, which in turn causes arm 410 to pivot light source 225 between the position of FIG. 4A and the position of FIG. 4B. For one embodiment, the motor may be activated by electronic signals that may be supplied to the motor, e.g., from the controller, as described above in conjunction with actuator 430. For another embodiment, at least one of arms 410 may engage limit switches (not shown) on carriage 220 to stop the motor when the arm 410 is respectively at the positions of FIGS. 4A and 4B.

Figure 5:
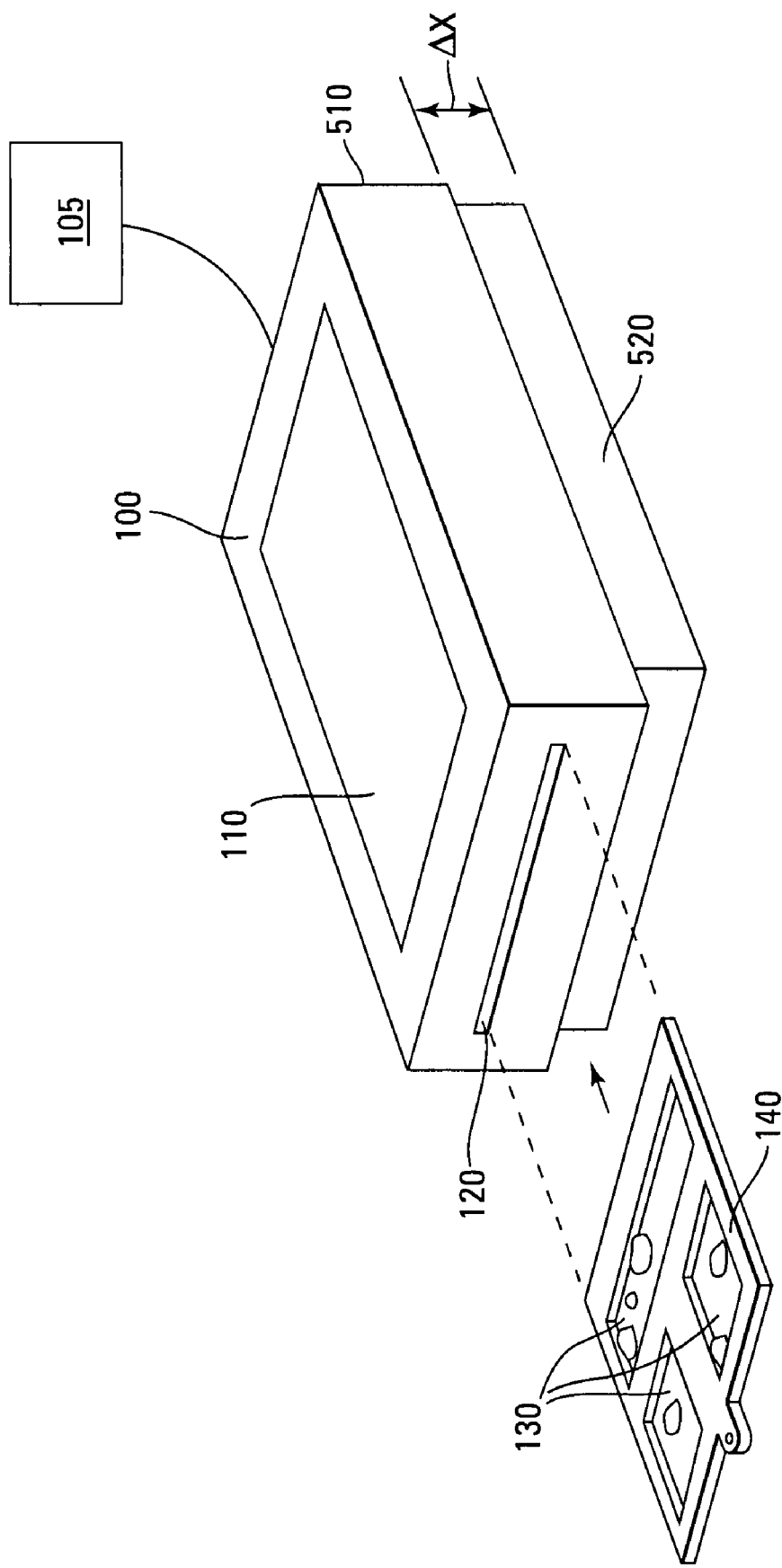
FIG. 5 is an isometric view of an embodiment of a scanner adjusted for scanning media substantially transparent to light, according to another embodiment of the disclosure.
Figure 6A:
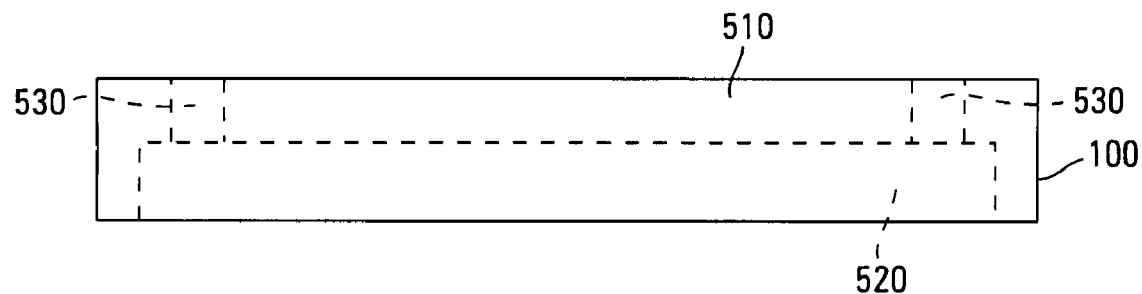
FIGS. 6A and 6B are side views illustrating raising an upper portion of an embodiment of a scanner, according to another embodiment of the disclosure.

For an alternative embodiment, scanner 100 may include an upper portion 510 that can move relative to a bottom portion 520, as shown in FIG. 5, where upper portion 510 includes platen 110. For one embodiment, one or more actuators 530, such as solenoids, raise and lower upper portion 510, as shown by the side views in FIGS. 6A and 6B. For one embodiment, an actuator 530, such as an actuator $530_1$, may be located adjacent each of the four corners of scanner 100, as shown in the plan view of FIG. 6C. For another embodiment, an actuator 530, such as an actuator $530_2$, may be positioned about midway between the opposing ends of scanner 100, i.e., along a direction parallel to the scanning direction, between each side of platen 110 and each side of scanner 100, as shown in FIG. 6C. Alternatively, for another embodiment, an actuator 530, such as an actuator $530_3$, may be positioned about midway between the opposing sides of scanner 100, i.e., along a direction perpendicular to the scanning direction, between each end of platen 110 and each end of scanner 100, as shown in FIG. 6C. For some embodiments, actuators, $530_1$ and $530_2$, actuators $530_1$ and $530_3$, or actuators $530_1$, $530_2$, and $530_3$ may be used.

Figure 6B:
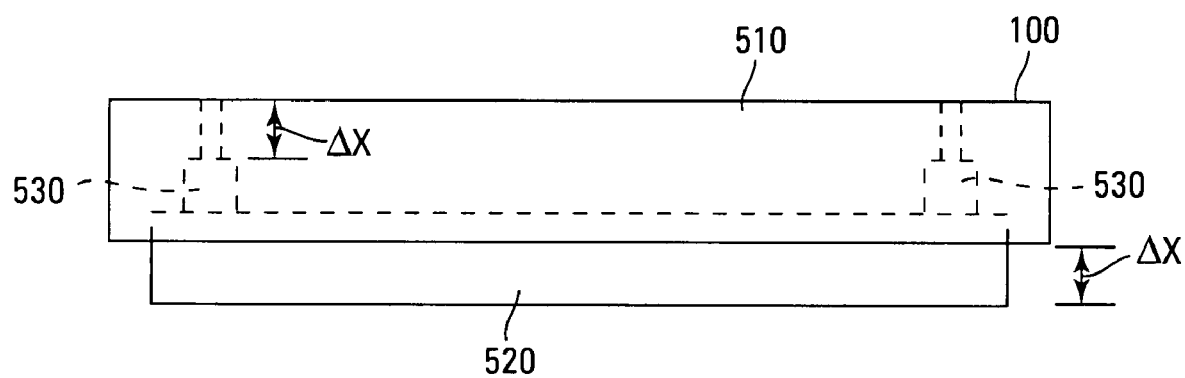
Figure 6C:
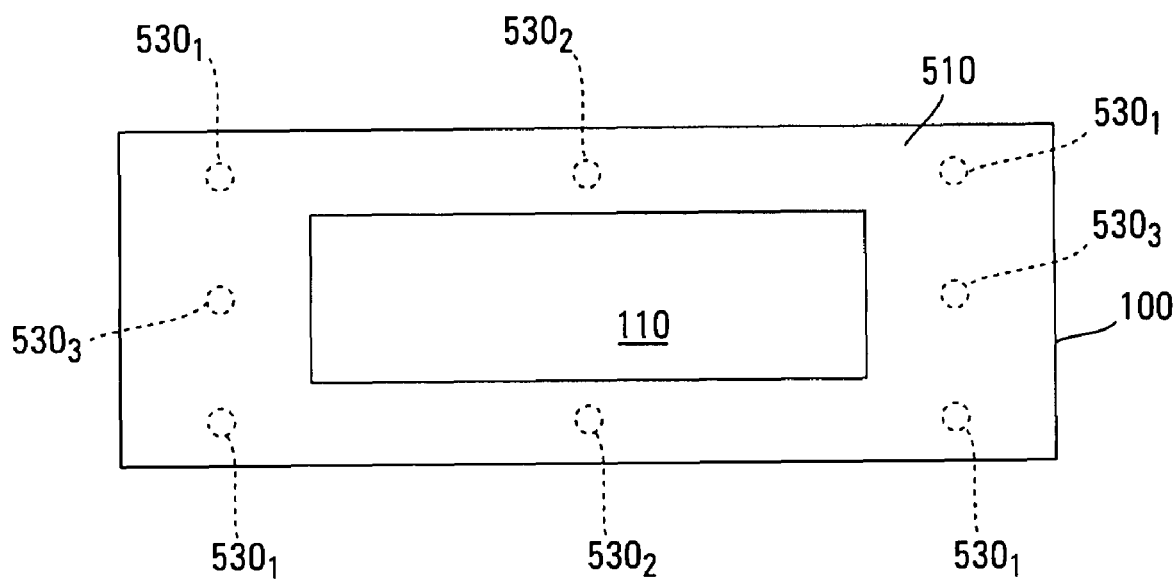
FIG. 6C is a plan view illustrating the placement of actuators for raising and lowering an upper portion of an embodiment of a scanner, according to another embodiment of the disclosure.
Figure 7:
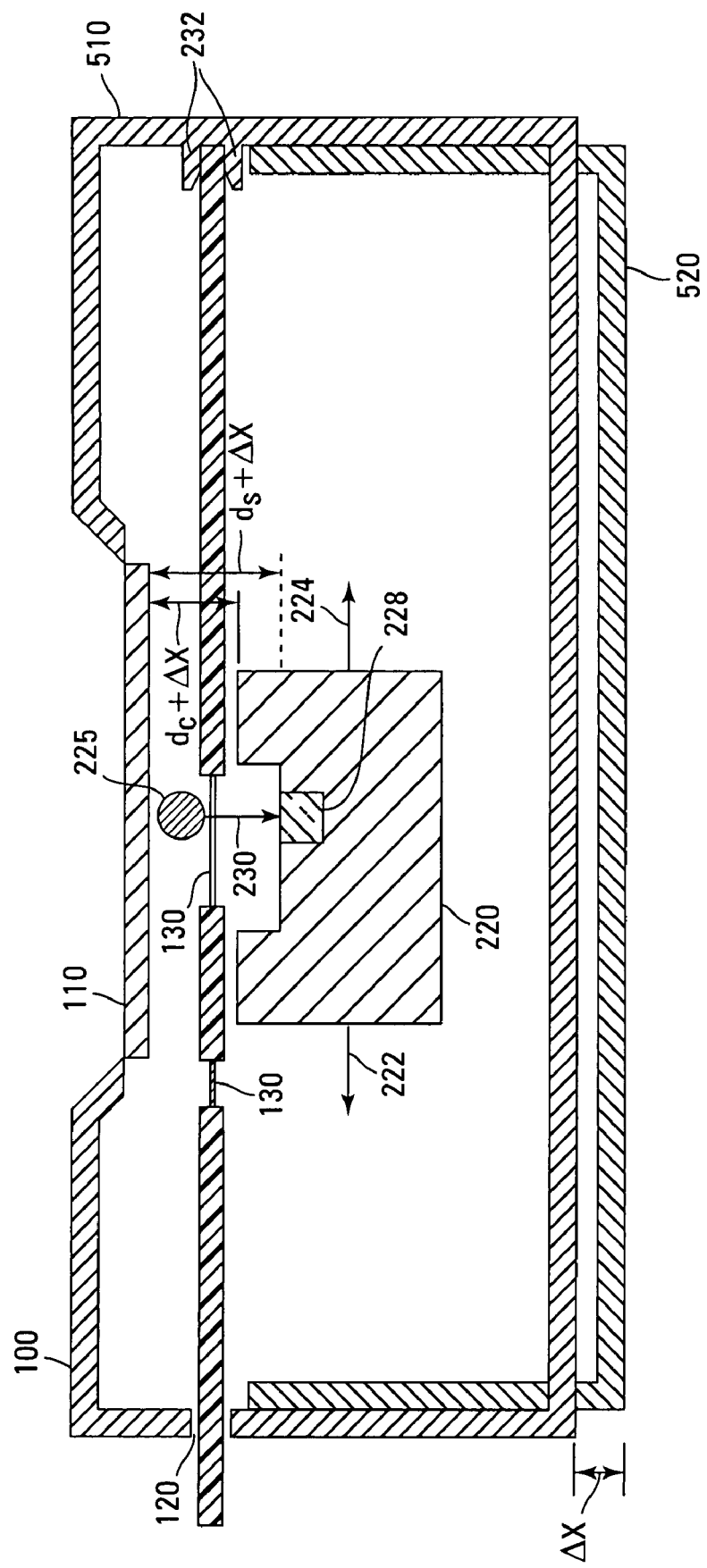
FIG. 7 is a cross-sectional side view of an embodiment of a scanner with a distance between a platen and a carriage adjusted for scanning media substantially transparent to light, according to another embodiment of the disclosure.

For one embodiment, upper portion 510 is in its raised position of FIGS. 5 and 6B when scanner 100 is in the transparent scanning mode. Raising upper portion 510 by a distance ΔX above lower portion 520 increases the distance $d_c$ between carriage 220 and platen 110 in the opaque scanning mode of FIG. 2A to a distance $d_c$+ΔX in the transparent scanning mode of FIG. 7, a cross-sectional side view of FIG. 5. Note that this also increases the distance $d_s$ between sensor 228 and platen 110 in the opaque scanning mode of FIG. 2A to a distance $d_s$+ΔX in the transparent scanning mode of FIG. 7. Note that for an alternative embodiment, carriage 220 may be lowered by ΔX instead of raising platen 110 to increase the distance between platen 110 and carriage 220 and thus the distance between platen 110 and sensor 228.

For one embodiment, light source 225 may be positioned in its transparency-scanning-mode position of FIG. 2B using the techniques described above in conjunction with FIGS. 4A-4C, e.g., actuator 430 in conjunction with arm 410 or a motor connected to shaft 420, after or substantially concurrently with increasing the distance between platen 110 and carriage 220 by ΔX. Subsequently, light source 225 may be returned to its opaque-scanning-mode position of FIG. 2A using actuator 430 in conjunction with arm 410, as described above in conjunction with FIGS. 4A-4C, before or substantially concurrently with decreasing the distance between platen 110 and carriage 220 by ΔX.

For another embodiment, the distance between platen 110 and carriage 220 is increased by ΔX in response to electrical signals from the controller (not shown) of scanner 100, e.g., in response to user inputs to computer 105 (FIGS. 1 and 5). For another embodiment, the controller controls actuators 530 in response to user inputs to computer 105 (FIG. 1). For example, the controller may send an electrical signal that causes actuators 530 to raise upper portion 510 from the position of FIG. 6A, corresponding to the opaque scanning mode for one embodiment, to the position of FIG. 6B, corresponding to the transparency scanning mode, in response to the user selecting the transparency scanning mode, e.g., from a menu displayed on the monitor of computer 105. The controller may also send an electrical signal that causes actuators 530 to lower upper portion 510 from the position of FIG. 6B to the position of FIG. 6A in response to the user selecting the opaque scanning mode, e.g., from a menu displayed on the monitor of computer 105.

Figure 8A:
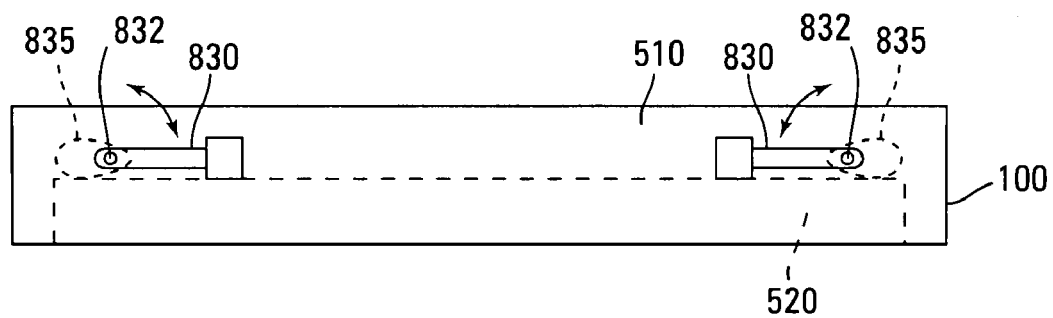
FIGS. 8A and 8B are side views illustrating an embodiment for manually raising and lowering an upper portion of an embodiment of a scanner, according to another embodiment of the disclosure.
Figure 8B:
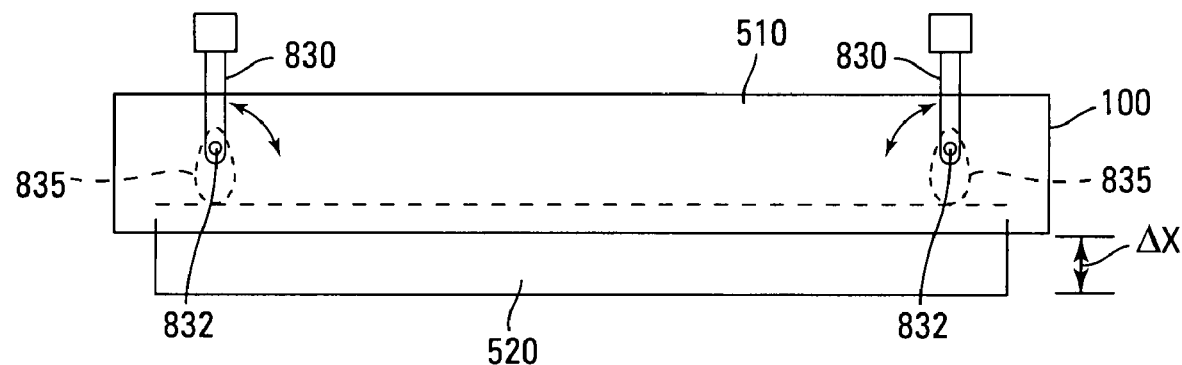
Figure 8C:
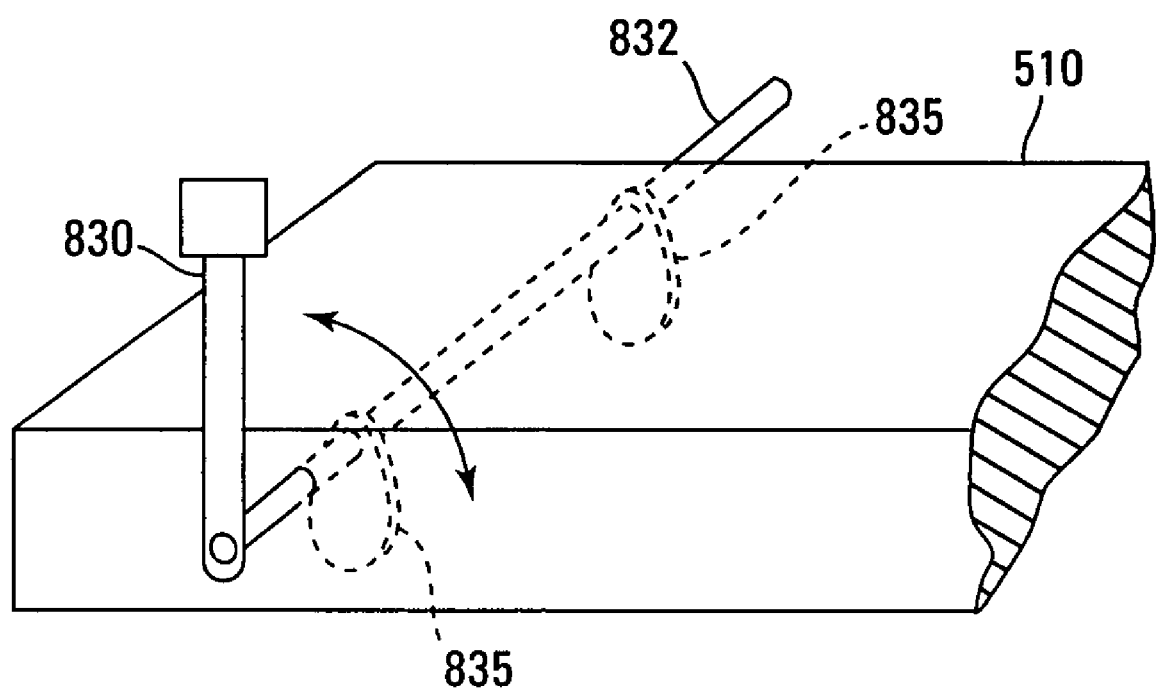
FIG. 8C is a perspective view of the upper portion of the scanner of FIG. 8B.

For another embodiment, upper portion 510 of scanner 100 may be raised and lowered manually using one or more levers 830, as shown in the side views in FIGS. 8A and 8B. For one embodiment, each of levers 830 may be fixedly attached to a shaft 832 that may be fixedly attached to one or more eccentric lobes 835, as shown in FIGS. 8A-8C. For one embodiment, shaft 832 may span the width of upper portion 510, as shown in FIG. 8C.

Shaft 832 may be rotatably attached to the upper portion 510 by bushings or bearings (not shown) that are respectively fixed to opposing sidewalls of upper portion 510. To raise upper portion 510 from its opaque-scanning mode position of FIG. 8A to its transparent scanning mode position of FIG. 8B, levers 830 are rotated from their positions shown in FIG. 8A to their positions shown in FIGS. 8B and 8C. Rotating levers 830 rotates the respective shafts 832, causing lobes 835 to engage an upper surface of bottom portion 520, as shown in FIG. 8B. The engagement between lobes 835 and bottom portion 520 exerts a vertical component of force on the respective shaft 832 that in turn exerts a vertical component of force on upper portion 510, via the bushings or bearings, that raises upper portion 510. Rotating levers 830 in the opposite direction lowers upper portion 510.

For one embodiment, light source 225 may be positioned in its transparency-scanning-mode position of FIG. 2B using the techniques described above in conjunction with FIGS. 4A-4C, e.g., actuator 430 in conjunction with arm 410 or a motor connected to shaft 420, after manually raising upper portion 510 from the position in FIG. 8A to the position in FIG. 8B. Subsequently, light source 225 may be returned to its opaque-scanning-mode position of FIG. 2A using actuator 430 in conjunction with arm 410, as described above in conjunction with FIGS. 4A-4C, before manually lowering upper portion 510 from the position in FIG. 8B to the position in FIG. 8A.

Figure 9A:
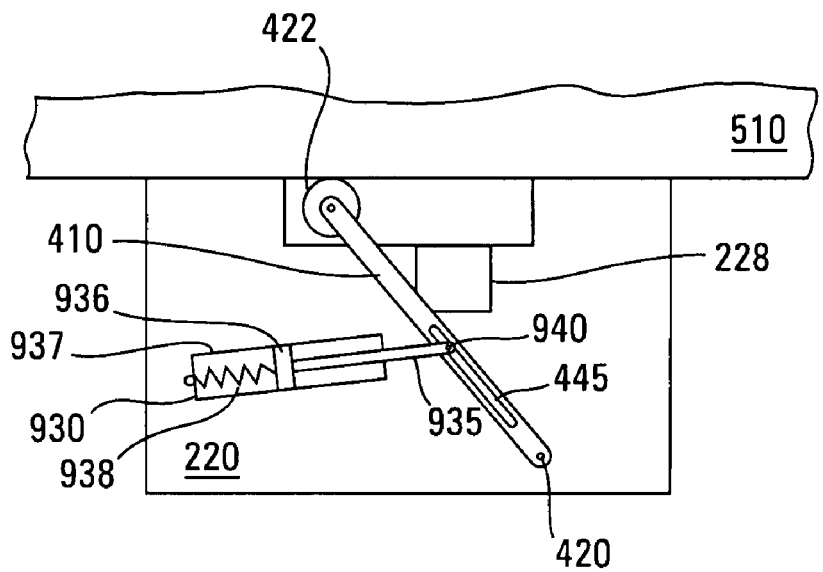
FIGS. 9A and 9B are side views of an embodiment of carriage of a scanner in two different operating modes, according to another embodiment of the disclosure.
Figure 9B:
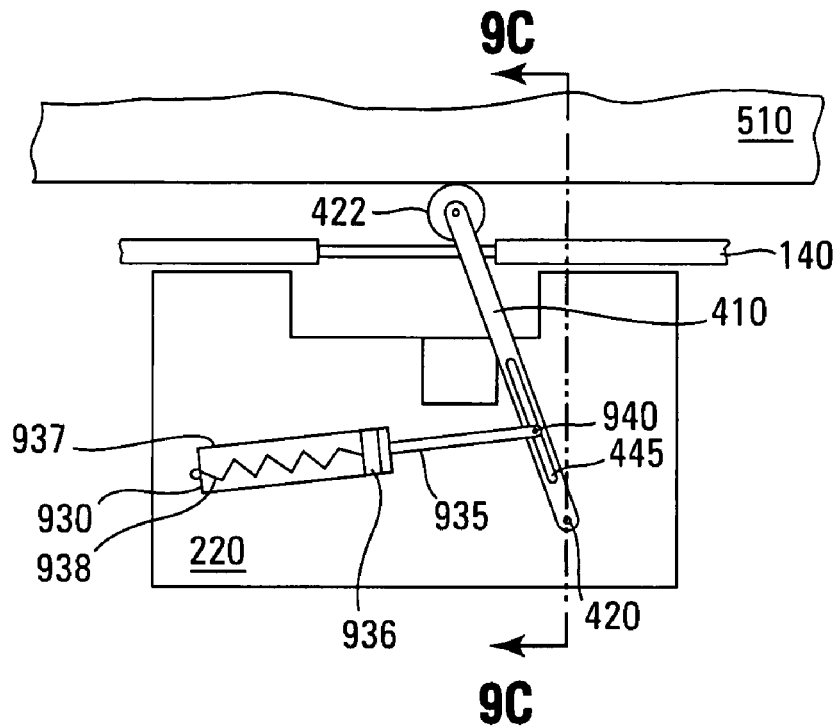

For one embodiment, the one or more actuators 430 of FIGS. 4A and 4B may be replaced, for example, by actuators 930, as shown in FIGS. 9A and 9B, side views of carriage 220 as may be viewed with one of the sidewalls of scanner 100 removed. For one embodiment, one or both of arms 410 are respectively connected to a ram 935 of an actuator 930 attached to carriage 220, as shown in FIGS. 9A and 9B for one of arms 410. More specifically, a ram 935 is slidably connected to a respective arm 410 by a pin 940 that passes through the slot 445 in the respective arm 410, as shown in FIGS. 9A and 9B. For one embodiment, ram 935 is formed with a pair of tines 948 on an end thereof that straddle arm 910, as shown in FIG. 9C, a view taken along line 9C-9C of FIG. 9B, and pin 940 passes through tines 948 and slot 445.

For one embodiment, each actuator 930 may have a spring-loaded piston 936 that may be movably disposed within a cylinder 937 of that actuator and that is connected to the ram 935 of that actuator, as shown in FIGS. 9A and 9B. For another embodiment, spring loading may be accomplished by disposing a spring 938 between piston 936 and an end of cylinder 937. For one embodiment, each actuator 930 biases the connector 422, connected to light source 225, against upper portion 510 in the opaque scanning mode of FIG. 9A and in the transparent scanning mode of FIGS. 9B and 9C via the arm 410 connected to that actuator. Specifically, spring 938 exerts a biasing force on ram 935 that imparts the biasing force to arm 410 that imparts the biasing force to connector 422 so that connector 422 is in forcible engagement with upper portion 510. This maintains contact between connector 422 and upper portion 510 as upper portion 510 is either raised or lowered. Therefore, in operation, for one embodiment, light source 225 can be moved from the position of FIG. 2A, corresponding to the opaque scanning mode, to the position of FIG. 2B, corresponding to the transparent scanning mode by raising the upper portion 510. Conversely, light source 225 can be moved from the position of FIG. 2B to the position of FIG. 2A by lowering the upper portion 510.

During scanning, connectors 422 may ride against upper portion 510. For other embodiments, connectors 422 may ride in a track (not shown) disposed in upper portion 510. Alternatively, a wheel (not shown) may be rotatably connected to each connector 422 so that each connector 422 is in rollable contact with upper portion 510 so that the wheel can roll on upper portion 510.

Figure 9C:
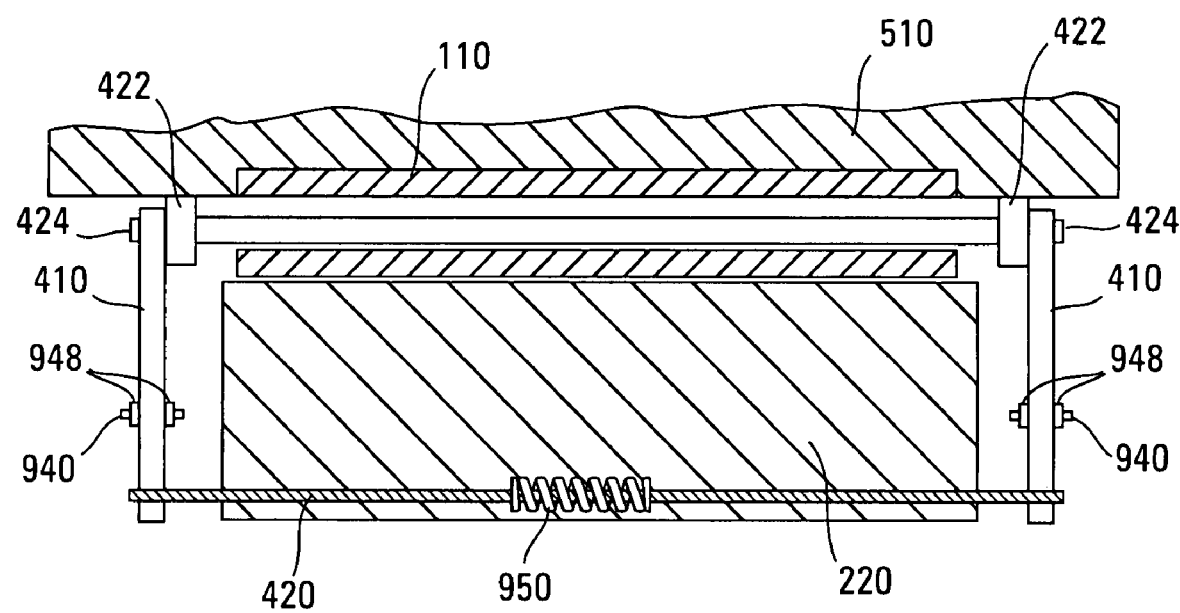
FIG. 9C is a view taken along line 9C-9C of FIG. 9B, according to another embodiment of the disclosure.

For another embodiment, a torsional spring 950 may be connected to shaft 420, as shown in FIG. 9C. In this embodiment, torsional spring 950 exerts a biasing force on shaft 420 that imparts the biasing force to arms 410 that impart the biasing force to connectors 422 so that connectors 422 is in forcible engagement with upper portion 510 as upper portion 510 is either raised or lowered.

CONCLUSION

Although specific embodiments have been illustrated and described herein it is manifestly intended that the scope of the claimed subject matter be limited only by the following claims and equivalents thereof.

What is claimed is:

1. A scanner, comprising:
    first and second portions, wherein the first portion is selectively movable relative to the second portion between first and second positions;
    a movable carriage;
    a platen that is substantially transparent to visible light overlying the carriage and disposed on the first portion so that the platen is selectively movable with the first portion; and
    a light source physically connected to the carriage for moving therewith, the light source selectively movable between a first position and a second position;
    wherein during a first mode of operation of the scanner, the first portion and the light source are at their respective first positions so that when a substantially opaque medium is placed on the platen for scanning, the platen is interposed between the substantially opaque medium and the light source; and
    wherein during a second mode of operation of the scanner, the first portion and the light source are at their respective second positions so that when a medium substantially transparent to light is positioned within the scanner for scanning, the light source is interposed between the platen and the medium substantially transparent to light.

2. The scanner of claim 1, wherein the first portion is configured to be manually selectively moved between its first and second positions.

3. The scanner of claim 1, wherein the first portion is configured to be selectively moved between its first and second positions in response to electrical signals.

4. The scanner of claim 1, wherein light source is configured to be moved substantially concurrently with the first portion.

5. The scanner of claim 1, wherein the selective movement of the light source depends upon the selective movement of the first portion.

6. The scanner of claim 1, wherein the selective movement of the light source is independent of the selective movement of the first portion.

* * * * *